United States Patent Office 2,986,561
Patented May 30, 1961

2,986,561

12α-HALO ALKYL-12β-HYDROXY-PREGNANE DERIVATIVES AND PROCESS FOR THE PRODUCTION THEREOF

Josef Fried, Princeton, N.J., assignor to Olin Mathieson Chemical Corporation, New York, N.Y., a corporation of Virginia No Drawing. Filed Oct. 23, 1959, Ser. No. 848,220

14 Claims. (Cl. 260—239.55)

This application is a continuation-in-part of Serial No. 751,860, filed July 30, 1958, now abandoned.

This application has for its object the provision of a new class of physiologically active steroids, which may be represented by the formula

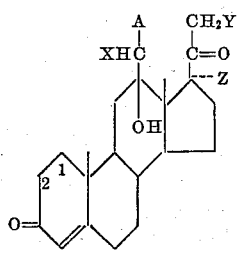

wherein the 1,2-position is saturated or double-bonded, A is hydrogen or lower alkyl, Y is hydrogen, hydroxy or acyloxy, X is halogen, and Z is hydrogen or hydroxy.

These steroids are prepared by interacting a 12-alkylidene steroid of the formula

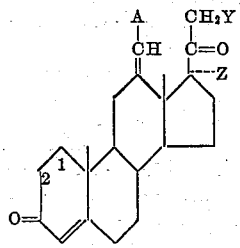

wherein the 1,2-position is saturated or double-bonded, and A, Y and Z are as hereinbefore defined, with an N-bromoamide (including imide) of a carboxylic acid [e.g., N-bromacetamide (or N-bromoamide of other lower fatty acids), N-bromosuccinimide and dibromodimethylhydantoin] or an N-chloramide (including imide) of a carboxylic acid [e.g., N-chloracetamide (or N-chloroamide of other lower fatty acids), N-chlorosuccinimide and dichlorodimethylhydantoin] in an inert organic solvent (e.g., dioxane or tertiary butanol) containing water and a relatively strong acid (e.g., perchloric acid).

The 12α-halo alkyl-12β-hydroxy steroids thus formed can then be converted to their 12-epoxy derivatives by treatment with a basic reagent such as potassium acetate, potassium carbonate, potassium hydroxide or sodium methoxide to yield a 12-epoxy derivative of the formula

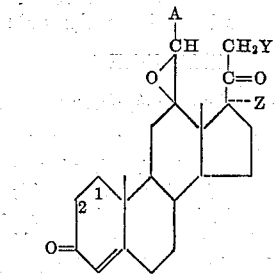

wherein the 1,2-position is saturated or double-bonded, and A, Y and Z are as hereinbefore defined, which are new intermediates of this invention.

The epoxides can then be interacted with a hydrogen halide (i.e., hydrogen fluoride, hydrogen chloride, hydrogen bromide and hydrogen iodide) in accordance with the methods disclosed in my application, Serial No. 417,489, filed March 10, 1954, to yield the respective 12α-halo alkyl-12β-hydroxy derivatives.

The 12α-halo alkyl-12β-hydroxy steroids of this invention possess progresstational activity, and thus may be used in lieu of known progestational steroids, such as progesterone, for example, in the treatment of habitual abortion, being formulated for such administration in the same type of parenteral preparations as progesterone, for example, with concentration and/or dosage based on the activity of the particular compound.

Suitable starting 12-alkylidene steroids for the process of this invention can be prepared as disclosed in the applications of Thomas et al., Serial No. 711,780, filed January 29, 1958, and Serial No. 847,044, filed October 19, 1959. Thus, the 12-alkylidene starting materials for this invention are prepared by interacting (A) one of the following: 12α-(lower alkyl)-11α-hydroxyprogesterone; 12α-(lower alkyl)-$\Delta^{1,4}$-pregnadiene-11α-ol-3,20-dione; 12α-(lower alkyl)-11α,17α-dihydroxyprogesterone; 12α-(lower alkyl)-$\Delta^{1,4}$-pregnadiene-11α,17α-diol-3,20-dione; or one of the following steroids in the free or 21-esterified form: 12α-(lower alkyl) - $\Delta^4$ - pregnene-11α,21-diol-3,20-dione; 12α-(lower alkyl) - $\Delta^{1,4}$ - pregnadiene-11α,21-diol-3,20-dione; 12α-(lower alkyl)-$\Delta^4$-pregnene-11α,17α,21-triol-3,20-dione; and 12α-(lower alkyl)-$\Delta^{1,4}$-pregnadiene-11α,17α,21-triol-3,20-dione; with (B) a lower alkyl or monocyclic hydrocarbon aromatic sulfonyl halide, such as mesyl chloride and tosyl chloride, whereby are formed the 11α-lower alkane (or monocyclic hydrocarbon aromatic) sulfonyloxy derivatives of the formula

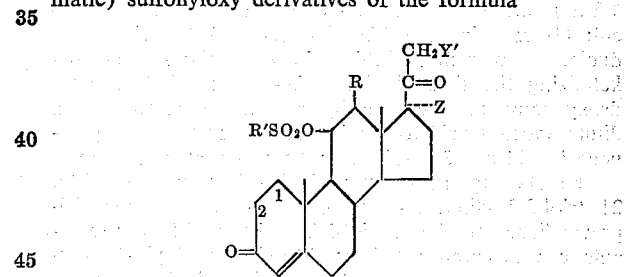

wherein the 1,2-position is saturated or double-bonded, R and Z are as hereinbefore defined, Y' is hydrogen or acyloxy, and R' is lower alkyl (preferably methyl) or monocyclic hydrocarbon aryl (preferably p-tolyl). The reaction is preferably conducted in an organic solvent in the presence of an organic base such as pyridine.

The starting 12α-(lower alkyl)-11α-hydroxyprogesterone and 12α-(lower alkyl)-$\Delta^{1,4}$-pregnadiene-11α-ol-3,20-dione reactants can be prepared by diketalizing 9α-fluoro-11-ketoprogesterone or 9α-fluoro-$\Delta^{1,4}$-pregnadiene-3,11,20-trione in the usual manner by treating with ethylene glycol in the presence of an acid catalyst, and interacting the 3,20-diketal of 9α-fluoro-11-ketoprogesterone or the 3,20-diketal of 9α-fluoro-$\Delta^{1,4}$-pregnadiene-3,11,20-trione thus formed with lithium lower alkyl (e.g., lithium methyl), thereby yielding the 3,20-diketal of 12α-lower alkyl (e.g., methyl)-11-ketoprogesterone or the 3,20-diketal of 12α-lower alkyl (e.g., methyl)-$\Delta^{1,4}$-pregnadiene-3,11,20-trione, respectively. The resulting diketals are reduced by means of a reducing agent, such as lithium metal in liquid ammonia, to yield the 3,20-diketal of 12α-lower alkyl-11α-hydroxyprogesterone or the 3,20-diketal of 12α-lower alkyl-$\Delta^{1,4}$-pregnadiene-11α-ol-3,20-dione, respectively, and then hydrolyzed in the usual manner, as by treatment with a dilute aqueous acid at an elevated temperature, to the desired 12α-lower alkyl-11α-hydroxyprogesterone or the 12α-lower alkyl-Δ$^{1,4}$-pregnadiene-11α-ol-3,20-dione respectively.

The starting 12α-(lower alkyl)-Δ$^4$-pregnene-11α-21-diol-3,20-dione-21-ester and 12α-(lower alkyl)-Δ$^{1,4}$-pregnadiene-11α,21-diol-3,20-dione-21-ester reactants are prepared by: (a) reducing, with a reducing agent such as lithium aluminum hydride, the 3,20-diketal of 12α-(lower alkyl)-11-ketoprogesterone and the 3,20-diketal of 12α-(lower alkyl)-Δ$^{1,4}$-pregnadiene-3,11,20-trione, respectively to obtain the corresponding 11β- hydroxy-derivatives; (b) treating the 11β-hydroxy derivative with a diester of oxalic acid (e.g., a lower alkyl ester such as ethyl oxalate) in the presence of approximately one equivalent of an alkali metal alkoxide (e.g., sodium methoxide), whereby the alkali metal enolate of the ester of 21-hydroxyoxalyl-12α-(lower alkyl)-11β-hydroxyprogesterone and 21-hydroxyoxalkyl-12α-(lower alkyl)-Δ$^{1,4}$-pregnadiene-11β-ol-3,20-dione are formed; (c) interacting the alkali metal enolate ester with a base, such as an alkali metal hydroxide, to yield a 21-oxalyl-12α-(lower alkyl)-11β-hydroxyprogesterone and 21-oxalyl-12α-(lower alkyl)-Δ$^{1,4}$-pregnadiene-11β-ol-3,20-dione, respectively; (d) treating the oxalyl compounds thus formed with iodine in a basic medium to yield 21-iodo-12α-(lower alkyl)-11β-hydroxyprogesterone and 21-iodo-12α-(lower alkyl)-Δ$^{1,4}$-pregnadiene-11β-ol-3,20-dione, respectively; (e) converting the 21-iodo group to a 21-acyloxy group by treatment with the desired acid salt (preferably in the presence of the free acid), thereby yielding a 21-ester of 12α-(lower alkyl)-corticosterone and 12α-(lower alkyl)-Δ$^{1,4}$-pregnadiene-11β,21-diol-3,20-dione, respectively, (f) oxidizing the 21-ester of 12α-(lower alkyl)-corticosterone (or the 1,2-unsaturated thereof) with an oxidizing agent such as chromium trioxide; (g) hydrolyzing the 11-keto analog thus prepared with a base such as potassium carbonate; (h) ketalizing the 12α-(lower alkyl)-11-dehydrocorticosterone (or the 1,2-unsaturate thereof), thus obtained, with ethylene glycol; (i) reducing the 3,20-bis-ethylene ketal with a reducing agent such as lithium in ammonia; and (j) deketalizing the thus obtained 12α-(lower alkyl)-11α-hydroxy compounds with a hydrolyzing agent such as a dilute aqueous acid to obtain 12α-(lower alkyl)-Δ$^4$-pregnene-11α,21-diol-3,20-dione or the 1,2-unsaturate thereof.

The starting 12α-(lower alkyl)-Δ$^4$-pregnene-11α,17α, 21 triol-3,20-dione-21-ester and 12α-(lower alkyl)-Δ$^{1,4}$-pregnadiene-11α,17α,21-triol-3,20 - dione - 21-ester reactants can be prepared from 12α-(lower alkyl)-11β-hydroxyprogesterones (e.g., 12α-methyl-11β-hydroxyprogesterone and 12α-ethyl-11β-hydroxyprogesterone) by the following series of reactions: (a) reacting the starting steroid with a diester of oxalic acid (e.g., a lower alkyl ester such as ethyl oxalate) in the presence of at least two equivalents of an alkali metal alkoxide (e.g., sodium methoxide) whereby the diester of 2,21-oxalyl-12α-(lower alkyl)-11β-hydroxyprogesterone, as well as its alkali metal dienolate, is formed; (b) reacting the diester with approximately three moles of bromine per mole of steroid and an alkali metal alkoxide to yield first the 2,21,21-tribromide derivative and then the alkyl ester of 2-bromo-12α-(lower alkyl)-Δ$^{4,17(20)}$-pregnadiene-11β-ol-3-one-21-oic acid; (c) debrominating the latter compound, as by treatment with zinc in an acid medium, to yield the corresponding 2-debrominated derivative; (d) treating the debrominated compound with pyrrolidine to yield 3-pyrrolidino - 12α-(lower alkyl)Δ$^{3,5,17(20)}$-pregnatriene-11β-ol-3-one-21-oic acid alkyl ester; (e) reducing the 21-acid, as by treatment with lithium aluminum hydride, to yield 12α-(lower alkyl)-Δ$^{4,17(20)}$-pregnadiene-11β,21-diol-3-one; (f) acylating the latter compound in the usual manner, as by treatment with the acyl halide or acid anhydride of a suitable organic carboxylic acid, to yield the 21-ester derivative; (g) reducing the 21-ester by treatment with oxmium tetroxide and phenyliodosoacetate to give the 21-esters of 12α-(lower alkyl) hydrocortisones; (h) oxidizing the 21-esters with an oxidizing agent (e.g., chromium trioxide) to yield 21-esters of 12α-(lower alkyl) cortisones; (i) hydrolyzing the 12-keto compound with a base such as potassium carbonate; (j) ketalizing the 12-keto analog, thus obtained, with ethylene glycol; (k) reducing, as by treatment with an alkali metal (e.g., lithium) in liquid ammonia, to yield the corresponding 11α-hydroxy derivatives; and (l) deketalizing the 11α-hydroxy derivative thus obtained by hydrolysis to give the desired 12α-(lower alkyl) - Δ$^4$ - pregnene - 11α,17α,21-triol-3,20-diones. The 12α - (lower alkyl) - Δ$^4$ - pregnene - 11α,17α,21-triol-3,20-diones can then be 1-dehydrogenated microbioally by means of *Bacterium cyclo-oxydans* by the method disclosed in U.S. Patent No. 2,822,318 to yield the corresponding 12α-(lower alkyl)-Δ$^{1,4}$-pregnadiene-11α,17α,21-triol-3,20-diones.

The 12α-(lower alkyl)-11α,17α-dihydroxyprogesterone and 12α - (lower alkyl) - Δ$^{1,4}$-pregnadiene-11α,17α-diol-3, 20-dione reactants can be prepared by interacting a 21-alkane sulfonic acid ester (e.g., mesyl and ethanesulfonyl) of a 12α-(lower alkyl) hydrocortisone (e.g., 12α-methylhydrocortisone or 12α-ethylhydrocortisone) or 12α-(lower alkyl) prednisolone (e.g., 12α-methyl prednisolone) with an alkali metal iodide (e.g., sodium iodide), preferably at an elevated temperature in an organic solvent for the steroid reactant, thereby yielding the corresponding 21-iodo derivatives [i.e., a 21-iodo-12α-(lower alkyl)-11β-17α-dihydroxyprogesterone and a 21-iodo-12α-(lower alkyl) - Δ$^{1,4}$-pregnadiene-11β,12α-diol-3,20-dione]. The 21-iodo compounds thus formed are then treated with an alkali metal bisulfite (e.g., sodium bisulfite) to deiodate the intermediate thereby forming 12α-(lower alkyl) - 11β,17α - dihydroxyprogesterones. The 11β-hydroxy steroids thus formed are then oxidized in the usual manner, as by treatment with a hexavalent chromic compound (e.g., chromium trioxide) to yield the corresponding 11-keto derivatives [e.g., a 12α-(lower alkyl)-11-keto-17α-hydroxyprogesterone and a 12α-(lower alkyl)-Δ$^{1,4}$-pregnadiene-17α - ol - 3,11,20-trione). The 11-keto compounds are then ketalized, as by treatment with a dihydric alcohol (e.g., ethylene glycol) to yield the corresponding 3,20-diketal derivatives, which in turn are reduced, as by treatment with an alkali metal (e.g., lithium) in liquid ammonia, to yield the corresponding 11α-hydroxy derivatives. These 11α-hydroxy steroids can then be hydrolyzed, as by treatment in a suitable solvent such as methanol with a dilute aqueous acid at an elevated temperature, to yield 12α-(lower alkyl)-Δ$^4$-pregnene-11α, 17α-diol-3,20-diones and 12α-(lower alkyl)-Δ$^{1,4}$-pregnadiene-11α,17α-diol-3,20-diones.

The intermmediate 11α-lower alkane (or monocyclic hydrocarbon aromatic) sulfonyloxy derivatives are then treated with a salt of a strong base and weak acid (e.g., sodium acetate) in the presence of a weak acid (e.g., acetic acid) whereby the alkane (or monocyclic hydrocarbon aromatic) sulfonic acid is split off to give the desired 12-alkylidene final products. If a 21-ester is employed as the starting reactant and a free 21-hydroxyl compound is desired, the steroid may be hydrolyzed in the usual manner to yield a free 21-hydroxyl steroid.

The following examples are illustrative of the invention (all temperatures being in centigrade):

EXAMPLE 1

*12α-bromomethyl-12β-hydroxyprogesterone*

To a solution of 100 mg. of 12-methyleneprogesterone in 7.1 ml. of dioxane and 4.2 ml. of 0.16 N perchloric acid is added 62 mg. of N-bromoacetamide and the solution allowed to remain in the dark at room temperature for 20 minutes. Excess N-bromoacetamide is destroyed by the addition of sodium sulfite, and chloroform and water is added. The chloroform-dioxane phase is extracted with dilute sodium bicarbonate solution and water, dried over sodium sulfate and the solvents evaporated in vacuo.

The residue is dissolved in 3 ml. of benzene and 9 ml. of hexane and the solution chromatographed on 2 gm. of acid-washed alumina. Elution with 1200 ml. of benzene-hexane (1:3) yields amorphous material, which is followed by a crystalline fraction when the elution is continued first with 800 ml. of benzene-hexane (1:1) and finally with 400 ml. of pure benzene. Recrystallization from acetone-hexane furnishes the pure bromohydrin having the following properties: M.P. about 170° (dec.); $[\alpha]_D^{23}$ +71° (c., 1.0 in CHCl$_3$);

$\lambda_{max}^{alc.}$ 238 m$\mu$ ($\epsilon$=17,000); $\lambda_{max}^{Nujol}$ 3.01, 5.99, 6.20$\mu$ Analysis.—Calcd. for $C_{22}H_{31}O_3Br$ (423.31): C, 62.41; H, 7.38; Br, 18.88. Found: C, 62.61; H, 7.38; Br, 16.68.

Once seed crystals are available the bromohydrin can be crystallized directly from ether. The bromohydrin is not altered by treatment with cromium trioxide in acetone.

EXAMPLE 2

*Oxido-12-methyleneprogesterone*

To a solution of 30 mg. of 12α-bromomethyl-12β-hydroxy progesterone in 3 ml. of methanol is added with stirring at room temperature 0.2 ml. of 10% potassium carbonate. After one-half hour the mixture is neutralized with glacial acetic acid and after the addition of water extracted with chloroform. The chloroform solution is washed with water, dried over sodium sulfate and the solvents removed in vacuo. The residual epoxide after crystallization from acetone-hexane has the following properties: M.P. about 145–146°, $[\alpha]_D^{23}$ +160° (c. 1.06 in CHCl$_3$);

$\lambda_{max}^{alc.}$ 238 m$\mu$ ($\epsilon$=14,600); $\lambda_{max}^{Nujol}$ 5.89, 6.97, 6.19$\mu$ Analysis.—Calcd. for $C_{22}H_{30}O_3$ (342.46): C, 77.15; H, 8.83. Found: C, 77.38; H, 8.78.

Treatment of the epoxide with hydrogen bromide in chloroform-glacial acetic acid at 0° for 20 minutes regenerates the starting bromohydrin.

EXAMPLE 3

*12α-chloromethyl-12β-hydroxyprogesterone*

To a solution of 25 mg. of oxido-12-methyleneprogesterone in 2.5 ml. of chloroform is added at 0° 0.35 ml. of 0.54 N hydrogen chloride in chloroform. After 2 hours at 0° more chloroform, and dilute sodium bicarbonate is added to neutralize the excess acid, and the resulting chloroform extract is washed with water and dried over sodium sulfate. The residual chlorohydrin is recrystallized from acetone-hexane.

EXAMPLE 4

*12α-fluoromethyl-12β-hydroxyprogesterone*

To a solution of 60 mg. of oxido-12-methyleneprogesterone in 9.5 ml. of chloroform and 0.5 ml. of ethanol is added at 0° hydrogen fluoride gas until a substantial layer of hydrogen fluoride has formed. The mixture is agitated at 0° for one hour and twenty minutes, neutralized with sodium bicarbonate and the layers separated. The chloroform phase is washed with water, dried over sodium sulfate and the solvent removed in vacuo. The residue is purified by crystallization from acetone-hexane.

EXAMPLE 5

*12α-iodomethyl-12β-hydroxyprogesterone*

Following the procedure of Example 3, but substituting 0.1 ml. of 54% aqueous hydrogen iodide for the hydrogen chloride there is obtained 12α-iodomethyl-12β-hydroxyprogesterone.

EXAMPLE 6

*12α-fluoromethyl-Δ⁴-pregnene-12β,21-diol-3,20-dione 21-acetate*

Following the procedures of Examples 1, 2 and 3, but substituting 100 mg. of 12-methylene-21-hydroxyprogesterone 21-acetate for the 12-methyleneprogesterone in Example 1, there is obtained 12α-bromomethyl-12β,21-dihydroxyprogesterone 21-acetate, oxido-12-methylene-21-hydroxyprogesterone 21-acetate, and 12α-fluoromethyl-12β,21-dihydroxyprogesterone 21-acetate, respectively.

Similarly, other esters, such as the 21-propionate and 21-benzoate yield the corresponding ester derivatives. Furthermore, the 21-acetate obtained in Example 6 can be hydrolyzed in the usual manner, as by treatment with potassium carbonate to yield the free 21-hydroxy derivative.

EXAMPLE 7

*12α-fluoromethyl-Δ⁴-pregnene-12β,17α,21-triol-3,20-dione*

Following the procedures of Examples 1, 2 and 3, but substituting 100 mg. of 12-methylene-Δ⁴-pregnene-17α,21-diol-3,20-dione for the 12-methyleneprogesterone in Example 1, there is obtained 12α-bromomethyl-Δ⁴-pregnene-12β,17α,21-triol-3,20-dione, oxido-12-methylene-Δ⁴-pregnene-17α,21-diol-3,20-dione, and 12α-fluoromethyl-Δ⁴-pregnene-12β,17α,21-triol-3,20-dione, respectively.

Similarly, 12-methylene-Δ¹,⁴-pregnadiene-3,20-dione, 12-methylene-Δ¹,⁴-pregnadiene-17α,21-diol-3,20-dione, and 12-ethylidene-progesterone yield the corresponding 12α-bromomethyl-12β-hydroxy, 12α-(1-bromoethyl)-12β-hydroxy; oxido-12-methylene, oxido-12-ethylidene; and 12α-fluoromethyl-12β-hydroxy- and 12α-(1-fluoroethyl)-12β-hydroxy derivatives.

The invention may be variously otherwise embodied within the scope of the appended claims.

What is claimed is:

1. A member selected from the group consisting of a steroid of the general formula

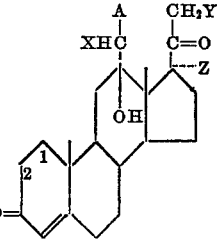

and the 1,2 unsaturate thereof, wherein A is selected from the group consisting of hydrogen and lower alkyl, Y is selected from the group consisting of hydrogen, hydroxy and acyloxy, X is halogen, and Z is selected from the group consisting of hydrogen and hydroxy.

2. 12α-(1-halo-lower alkyl)-12β-hydroxyprogesterone.
3. 12α-fluoromethyl-Δ⁴-pregnene-12β-ol-3,20-dione.
4. 12α-chloromethyl-Δ⁴-pregnene-12β-ol-3,20-dione.
5. 12α-bromomethyl-Δ⁴-pregnene-12β-ol-3,20-dione.
6. 12α-(1-halo-lower alkyl) - Δ⁴ - pregnene-12β,21-diol-3,20-dione.
7. 12α-(1-halo-lower alkyl) - Δ⁴ - pregnene-12β,17α,21-triol-3,20-dione.
8. A member selected from the group consisting of steroids of the general formula

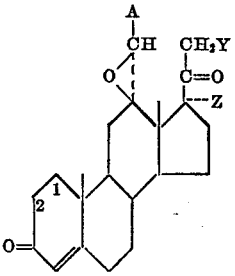

and the 1,2 unsaturates thereof, wherein A is selected from the group consisting of hydrogen and lower alkyl, Y is selected from the group consisting of hydrogen, hydroxy, and acyloxy, and Z is selected from the group consisting of hydrogen and hydroxy.

9. A process for preparing a steroid of claim 1 wherein X is selected from the group consisting of bromo and chloro, which comprises interacting a member selected from the group consisting of compounds of the general formula

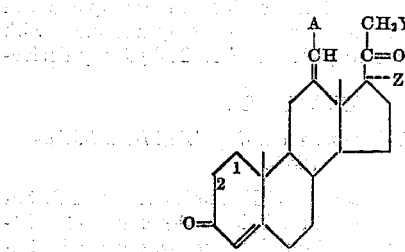

and the 1,2 unsaturates thereof, wherein A, Y, and Z are as defined in claim 1, with a halo compound selected from the group consisting of an N-bromoamide and an N-chloroamide of a carboxylic acid in an aqueous medium, and recovering the steroid formed.

10. A process for preparing 12α-bromomethyl-Δ⁴-pregnene-12β-ol-3,20-dione, which comprises interacting 12-methylene progesterone with an N-bromoamide of a carboxylic acid in an aqueous medium, and recovering the steroid formed.

11. The process of claim 10, wherein the N-bromoamide is N-bromacetamide.

12. A process for preparing a steroid of claim 1, which comprises interacting a steroid of claim 8 with a hydrogen halide.

13. A process for preparing 12α-halomethyl-12β-hydroxyprogesterone, which comprises interacting oxido-12-methylene progesterone with a hydrogen halide.

14. The compound of the formula

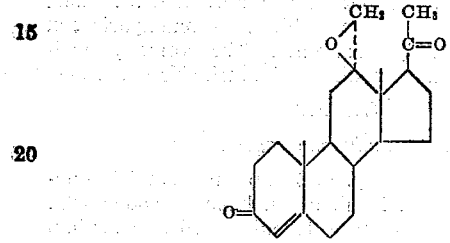

No references cited.